United States Patent [19]

Smith

[11] 3,755,966

[45] Sept. 4, 1973

[54] DEEP ROOT FEEDER AND TREE IRRIGATER

[76] Inventor: Wayne D. Smith, Rt. 1, Box 68, Tampa, Fla. 33612

[22] Filed: May 24, 1972

[21] Appl. No.: 256,296

[52] U.S. Cl. ............................................... 47/48.5
[51] Int. Cl. .............................................. A01g 29/00
[58] Field of Search ....................... 47/41.1, 48.5, 25

[56] References Cited
UNITED STATES PATENTS

| 349,874 | 9/1886 | Buhrer | 47/48.5 |
| 1,280,486 | 10/1918 | Kanst | 47/48.5 |
| 1,778,030 | 10/1930 | Kanst | 47/48.5 |
| 2,145,934 | 2/1939 | Kingman | 47/48.5 X |
| 3,319,379 | 5/1967 | Groeber et al | 47/48.5 |

Primary Examiner—Robert E. Bagwill
Attorney—George B. Oujevolk

[57] ABSTRACT

An elongated cylinderical cannister assembly with many small apertures at the opposite ends filled with gravel and fertilizer pellets, is placed near the tree. This insures that water, air, and nutrition is carried to the outer ends of the roots. The deep root feeder is particularly useful in cities where trees grow through pavement openings.

1 Claim, 4 Drawing Figures

DEEP ROOT FEEDER AND TREE IRRIGATER

BACKGROUND OF THE INVENTION

The present invention relates to arbor management and more particularly to the proper care and management of trees in cities or along paved highways.

BRIEF REVIEW OF THE PRIOR ART

In the planning of landscape architecture, it is customary for the architect to attempt to plan trees along city streets and highways. This however, not only presents problems of mite control, but also problems in properly feeding, airing and watering the trees.

Although many attempts have been made to properly provide for nutrition, air and water to trees growing along streets and highways, none, as far as I am aware, have been completely successful.

SUMMARY OF THE INVENTION

It has now been discovered that if an elongated cylindrical cannister assembly with many small apertures at opposite ends, filled with gravel and fertilizer pellets is placed vertically in the ground near the tree, water and nutrition can be carried to the roots of the tree.

The invention as well as other objects and advantages there of, will become more apparent from the following detailed description when taken together with the accompanying drawing, in which:

DETAILED DESCRIPTION

Figure 1:
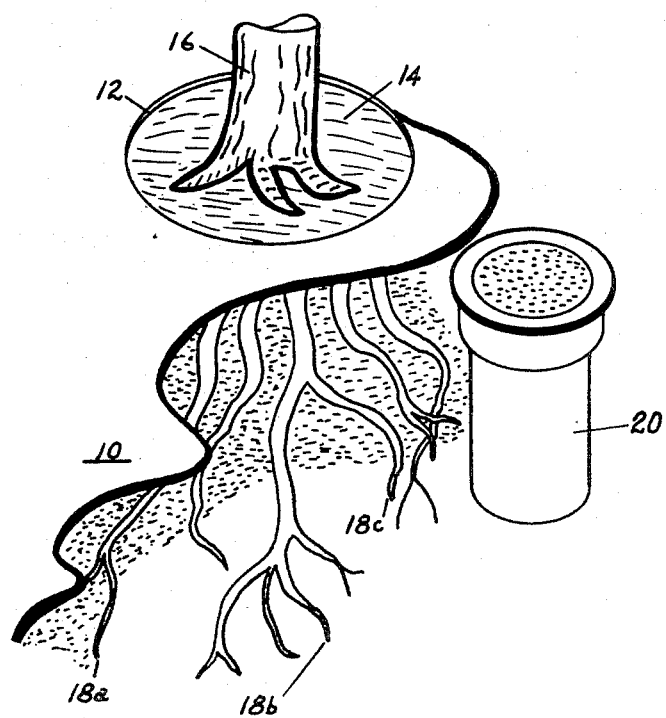
FIG. 1 is a perspective view of the inventive concept showing the utilization of the deep root feeder contemplated herein.

Depicted in FIG. 1 is a paved street or road, 10, with an opening, 12, therein, about 3 to 6 feet in diameter. Through this opening it is possible to see the soil, 14, and a tree, 16, planted therein. Under the soil, 14, the tree, 16, has roots 18a, 18b, 18c.

Figure 2:
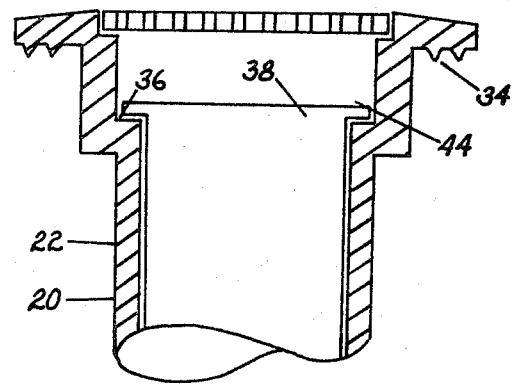
FIG. 2 shows a cross-sectional side view of the deep root feeder.
Figure 3:
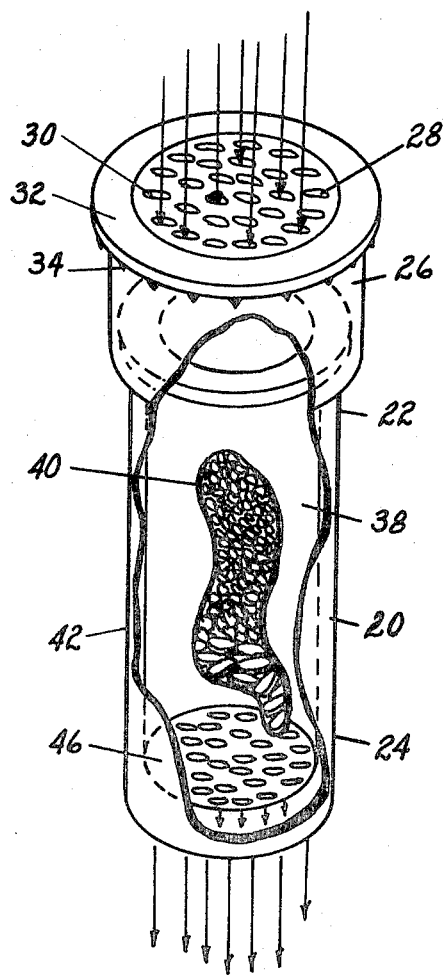
FIG. 3 shows a perspective explanation with parts broken away illustrating the inventive concept.

Disposed very near the soil is a cylindrical cannister extending down from the top of assembly 20, the details of which are illustrated in FIG. 2 and FIG. 3.

Cannister assembly, 20, has an elongated cylindrical outer shell housing, 22, made of not readily oxidized material, e.g., a heavy plastic, and includes a lower receptacle section, 24, and an upper neck section, 26. The neck section has an upper wall cover, 28, with a plurality of small apertures, 30. Surrounding the upper wall, 28, is a disc-like flange 32 with lower teeth 34 around the periphery. Within the neck at the bottom thereof is an inner stepped section 36.

Within the outer shell housing 22 is a cylindrical cannister, 38. Cannister, 38, is hollow and filled with gravel, 40, and fertilizer pellets, 42. At the upper end of cannister, 38, is an outer flange 44 which rests on inner stepped section 36 of the housing. The bottom of the cannister, 38, also has apertures, 46.

OPERATION OF THE INVENTION

The unit has only three pieces. The housing is 18 inches long, the outside diameter is 4 inches. The lid, or cover, is formed to fit over the neck in the head of the unit. It is 4 inches in diameter. The head of the unit is flared to extend 1 inch on any side of the unit, to hold it firmly in place, it is 6 inches in diameter.

The cannister is 3½ inches in diameter outside, 8 inches in length, has an open top and holes in the bottom.

Figure 4:
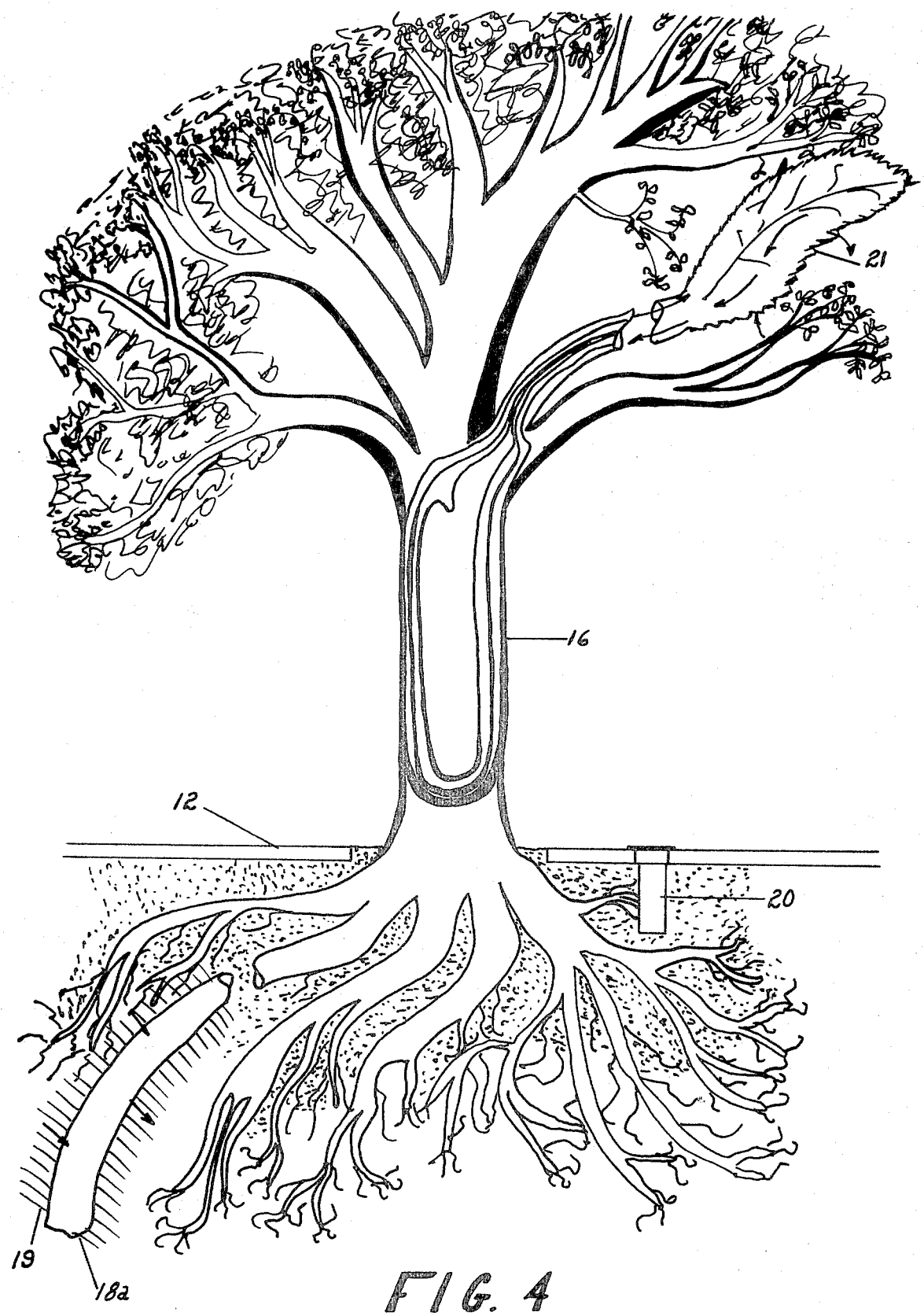
FIG. 4 is another perspective explanation of the method of using the inventive concept.

The cannister, removed from the housing, is filled with fertilizer and gravel. Then it is placed in the housing with the top flange resting on the housing inner stepped section. The cover is then placed over the housing. There is an empty vent space between the top of the cannister and the cover. The cannister is then placed in the soil as shown in FIG. 4, in a vertical position in the last 6 feet of the outer circumference of the canopy of the tree. More than one cannister per tree can be used, for very large trees. Also, one can be used to service several trees. One system will serve an area 10 feet in diameter.

The operation of the system is best illustrated in FIG. 4 showing a tree, 16, with enlarged root 18a, root hairs 19, the cannister assembly 20 and enlarged leaf 21.

The health of a tree is dependent upon the manufacture of food in the leaves, 21. The leaves, 21, receive nutrients and water from the roots 18a (see FIG. 4). Roots require an intake of oxygen in order to function. One of the root's primary sources for oxygen is natural rainfall through the root hairs 19.

In most cities, towns and developments, only a small percentage of rainfall reaches the soil. Storm drains and asphalt paving provide a rapid water run-off, thus tree roots must forage for nutrients, causing greater root extension and perhaps root protrusion through soil and pavement.

This explains the slow death of trees surrounded by asphalt or on parkways or within the confines of a city.

This system will give any land development the added value of healthy long lasting, beautiful, sought-after trees without sacrificing land-use efficiency. A tree will be able to thrive although its roots are completely covered by an asphalt paved parking lot.

Here's what the Deep Root Feeder will do:

1. Trees can be used effectively in project designs;
2. Forget about the unnecessary expense of tree removal six months after the property has been opened;
3. Trees can be allowed to stand in parking lots;
4. Tree roots will not burst through foundations or rupture sidewalds or tear up concrete or asphalt.
5. It is possible to plan on property maintaining its natural beauty for as long as trees stand;
6. It is possible to protect the environment now before some form of tree preservation is a legal imperative.

The basic unit of the system consists of an 18 inch deep by 4 inch diameter heavy duty plastic housing which holds a removable inner sleeve cannister which contains time-release nutrients. Liquid fertilizers can also be used.

The housing is set into the ground deep enough to allow its perforated top to protrude one-quarter inch above the ground. Air and water enter the top and are filtered down, through gravel and ultimately to the roots (see FIG. 4). Housings are placed at 10 foot intervals around the tree. The distance of the ring of housings varies with the size of the overall canopy, for best results they should be placed in the last 6 feet of the trees drip line or directly beneath the outer band of the canopy: the distance of the feeder root ends from the base of the tree.

The fertilizer contained in the unit is concentrated, high in nitrogen content and non-toxic; this means it will not harm tree roots or any vegetation it contacts in its concentrated form. Liquid fertilizers and soil conditioner can alwo be used.

The seven-eighth inch × 1 ⅛ inch fertilizer tables break down slowly as water passes through the gravel sifting soil over them. Bacteria in the soil activates the chemical release of the fertilizer.

The system can be installed in 10 minutes and annual servicing can be accomplished in another simple 10 minute operation.

One other point may be considered. One system provides enough nutrients to service an area of soil 10 feet in diameter. Any number of trees whose roots feed in that given area can benefit from that unit.

The system, if applied properly and quickly, can save literally thousands of trees that are slowly dying of malnutrition. It can save big trees and nurse smaller ones back to vitality. It can virtually put an end to developer's headaches regarding costly, time-consuming tree removal. It can increase land value and guarantee maintenance of the tree aspect of natural beauty. It can prevent tree roots from destroying pavement and foundations.

In short, the system can simulate a natural environment for trees, making the hostile, unfamilar environment of commercial and residential developments compatible with trees, providing a needed solution to the desperate dilemma of dying trees.

I claim:

1. A deep root tree feeder and tree irrigater arrangement, comprising in combination
   a. an outer cylindrical shell housing (22) open at both ends for housing a cannister therein having a lower receptacle section (24) and an upper neck section (26) said neck section having an inner stepped section (36) and an outwardly extending flange (32) at the outer end of said neck section; and,
   b. an upper wall cover (28) with a plurality of apertures therein; and,
   c. a hollow cylindrical cannister (38) with an upper outward flange resting on said inner stepped section (36) filled with gravel (40) and fertilizer pellets (42) said cannister (38) having a plurality of apertures at the bottom thereof.

* * * * *